US008799941B2

(12) United States Patent
Nguyen et al.

(10) Patent No.: US 8,799,941 B2
(45) Date of Patent: Aug. 5, 2014

(54) METHOD AND SYSTEM FOR AUTOMATING ADVERTISING INSERTION AND RECONCILIATION

(75) Inventors: Dien V. Nguyen, Torrance, CA (US);
Joseph T. Hayes, Torrance, CA (US);
Richard F. Purpura, Orange, CA (US);
Jason Y. Shimizu, Torrance, CA (US);
James E. Yokers, Castaic, CA (US);
Dennis N. Tan, Arcadia, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 510 days.

(21) Appl. No.: 12/875,481

(22) Filed: Sep. 3, 2010

(65) Prior Publication Data
US 2012/0060184 A1    Mar. 8, 2012

(51) Int. Cl.
*H04N 7/10* (2006.01)
*H04N 7/025* (2006.01)

(52) U.S. Cl.
USPC .................. 725/32; 725/22; 725/36

(58) Field of Classification Search
USPC ...................................... 725/32, 36
See application file for complete search history.

(56) References Cited

U.S. PATENT DOCUMENTS

| | | | | |
|---|---|---|---|---|
| 5,826,165 | A * | 10/1998 | Echeita et al. | 725/22 |
| 2002/0083442 | A1* | 6/2002 | Eldering | 725/34 |
| 2003/0101454 | A1* | 5/2003 | Ozer et al. | 725/42 |
| 2004/0210944 | A1* | 10/2004 | Brassil et al. | 725/135 |
| 2006/0190970 | A1* | 8/2006 | Hellman | 725/75 |
| 2007/0157224 | A1* | 7/2007 | Pouliot et al. | 725/22 |
| 2008/0250447 | A1* | 10/2008 | Rowe et al. | 725/32 |
| 2010/0146542 | A1* | 6/2010 | Weihs et al. | 725/34 |
| 2010/0162288 | A1* | 6/2010 | Huffman et al. | 725/22 |

* cited by examiner

*Primary Examiner* — Robert Hance (57) ABSTRACT

A system and method for operating an ad extraction and reconciliation system for a broadcast system includes an extraction manager module that receives an advertisement schedule for an advertisement from an ad sales module. The system also includes a controller module that receives broadcast channel schedule data for broadcast channel signal from a broadcast channel system and generating an advertising content data request signal for advertising content data including an advertisement content identifier for the advertisement. The ad extraction manager module forms an advertisement insertion schedule having advertisement content identifier and an advertising insertion spot associated with the advertising content identifier. The controller communicates the advertisement insertion schedule to a broadcast scheduling system. The system also includes an as-run manager module that receives as-run data including the advertising identifier and a run time of the advertisement after the advertisement was inserted into the broadcast channel signal according to the broadcast scheduling system at an automation system.

27 Claims, 7 Drawing Sheets

METHOD AND SYSTEM FOR AUTOMATING ADVERTISING INSERTION AND RECONCILIATION

TECHNICAL FIELD

The present disclosure relates to a content processing and delivery system and, more specifically, to a method and system for automating and reconciliation of advertising in a content delivery system.

BACKGROUND

The statements in this section merely provide background information related to the present disclosure and may not constitute prior art.

Satellite television is increasing in popularity due to the ever-increasing amount of programming as well as the quality of programming. Programming includes standard national (CONUS) broadcasts, local or regional station broadcasts, on-demand content and interactive content.

Television providers often insert promotional material or commercials into various portions of a program. For cable television provider this is done locally. Oftentimes, this is a manual process. Providing a convenient and reliable method for insertion is desirable. Tracking the material is typically a manual process. However, a number of channels increases tracking content broadcast becomes cumbersome. Careful tracking is required so that the advertising sponsors may be properly billed.

Further billing the advertisement (ad) providers is typically a manual process. The manual process is time-consuming, and is not immediate. That is, personnel must be available to perform the billing. As well, the manual process is subject to errors resulting in lost revenue.

SUMMARY

The present disclosure provides a system and method for providing an efficient method for scheduling and reconciling advertisements.

In one aspect of the disclosure, a method includes receiving an advertisement schedule for an advertisement from an ad sales module at an ad extraction and reconciliation module, receiving broadcast channel schedule data from a broadcast channel system at the ad extraction and reconciliation module, generating an advertising content data request signal for advertising content data including an advertisement content identifier for the advertisement, forming an advertisement insertion schedule having advertisement content identifier and an advertising insertion spot associated with the advertising content identifier, communicating the advertisement insertion schedule to a broadcast scheduling system, inserting the advertisements corresponding to the advertisement identifiers into the broadcast signal according to the broadcast scheduling system at an automation system, in response to inserting, generating as-run data including the advertising identifier and a run time of the advertisement and communicating the as-run data to the ad sales module through the extraction and reconciliation module.

In another aspect of the disclosure, a system for operating an ad extraction and reconciliation system for a broadcast system includes an extraction manager module that receives an advertisement schedule for an advertisement from an ad sales module. The system also includes a controller module that receives broadcast channel schedule data for broadcast channel signal from a broadcast channel system and generating an advertising content data request signal for advertising content data including an advertisement content identifier for the advertisement. The ad extraction manager module forms an advertisement insertion schedule having advertisement content identifier and an advertising insertion spot associated with the advertising content identifier. The controller communicates the advertisement insertion schedule to a broadcast scheduling system. The system also includes an as-run manager module that receives as-run data including the advertising identifier and a run time of the advertisement after the advertisement was inserted into the broadcast channel signal according to the broadcast scheduling system at an automation system Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure is set forth with respect to a satellite broadcast television system. In particular, the following disclosure is made with respect to DIRECTV® broadcast services and systems. It should be understood that many other delivery systems are readily applicable to the disclosed systems and methods. Such systems include other wireless distribution systems, wired or cable distribution systems, cable television distribution systems, ultra high frequency (UHF)/very high frequency (VHF) radio frequency systems or other terrestrial broadcast systems (e.g., multi-channel multi-point distribution system (MMDS), local multi-point distribution system (LMDS), etc.), Internet-based distribution systems, cellular distribution systems, power-line broadcast systems, any point-to-point and/or multicast Internet protocol (IP) delivery network, and fiber optic networks. Further, the different functions collectively allocated among a head end (HE), integrated receiver/decoders (IRDs) and a content delivery network (CDN) as described below may be reallocated as desired without departing from the intended scope of the present patent.

Further, while the following disclosure is made with respect to the delivery of video (e.g., television (TV), movies, music videos, advertisements, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

Figure 1:
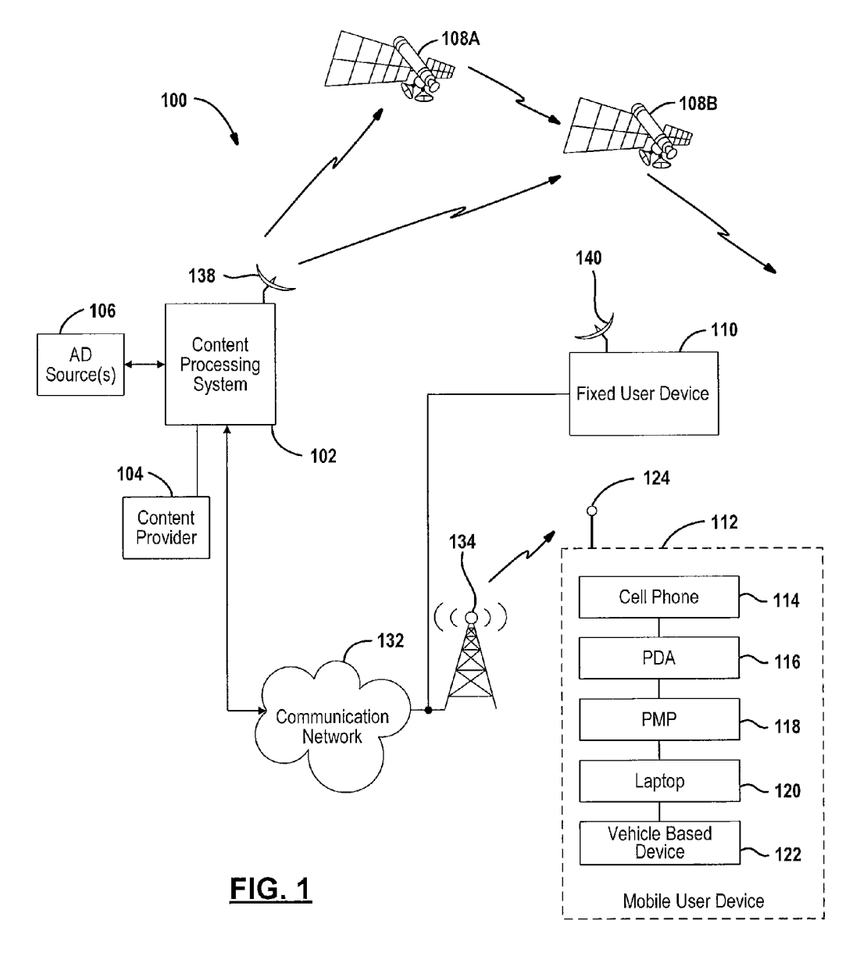
FIG. 1 is a schematic illustration of a communication system according to the disclosure.

Referring now to FIG. 1, a content communication system 100 includes a content processing system 102 that is used as a processing and transmission source. A plurality of content providers, one of which is shown at reference numeral 104 is used for providing content to the content processing system 102. An ad source module that may be referred to as an ad source or sources 106 may provide advertising to the content processing system 102. The ad sources 106 may provide the actual advertisements as well as an advertisement schedule for inserting the advertisements within the broadcast stream. The advertisement schedule may be referred to as a placement or placement response. In the following description the word "ad" will be used to refer to advertising or an advertisement. The ad sources 106 may provide advertising placements to replace advertising spots from the original content provider. Advertising spots refers to a timed position into which advertising may be placed. Advertisements may be placed relative to a break window which is a time range where a given number of breaks are to be played out. Each break contains a set of placements or spots. The breaks are queued to play out by an external trigger or tone that may be embedded in the broadcast by the content provider. Ad insertions during this period are known as "digital ad insertions." Non-digital ad insertions may also be incorporated into the system. Long-form programs such as "infomercials" may also be played out but may not use a triggering system and break windows as described above. This process will be further described below.

A first satellite 108A and a second satellite 108B may also be incorporated into the system. The satellites 108A, B may be used to communicate different types of data or different portions of various contents from the content processing system 102. The system 100 also includes a plurality of fixed user devices 110 such as integrated receiver/decoders (IRDs). Wireless communications are exchanged between the content processing system 102 and the fixed user devices 110 through one or more of the satellites 108A, B. The wireless communications may take place at any suitable frequency, such as but not limited to, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124.

In addition to communication via the satellites 108A, B, various types of data such as security information, encryption-decryption information, content, or content portions may be communicated terrestrially. A communication network 132 such as the public switched telephone network (PSTN), a terrestrial wireless system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Data or content provided to content processing system 102 from the media source 104 may be transmitted, for example, via an uplink antenna 138 to the satellites 108A, B, one or more of which may be a geosynchronous or geo-stationary satellite, that, in turn, rebroadcast the information over broad geographical areas on the earth that include the user devices 110, 112. The satellites 108A, B may have inter-satellite links as well. Among other things, the example content processing system 102 of FIG. 1 provides program content material and advertisements to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received.

Security of assets broadcast via the satellites 108A, B may be established by applying encryption and decryption to assets or content during content processing and/or during broadcast (i.e., broadcast encryption). For example, an asset may be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 108A, B. The user devices authorized to view and/or playback the broadcast encrypted asset will be able to correctly determine the CW by computing a cryptographic hash of the contents of the received CWP. If the user device 110 is not authorized, the user device 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

Figure 2:
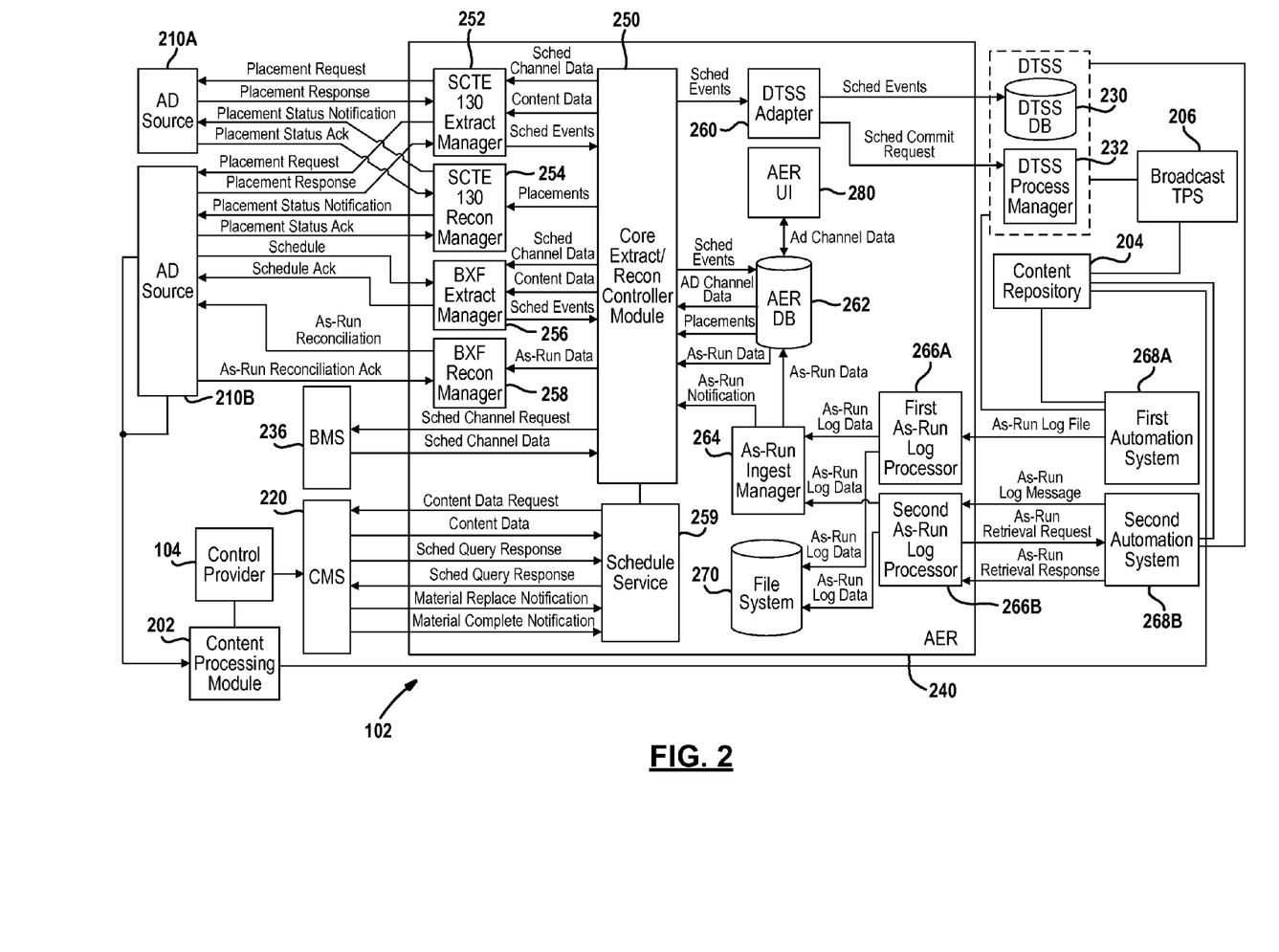
FIG. 2 is a detailed block diagrammatic view of the content processing system of FIG. 1.

Referring now to FIG. 2, the content processing system 102 of FIG. 1 is illustrated in further detail. The content provider 104 may include various types of content providers, including those that provide content by way of a satellite, DVD, via a network as a file, by way of tapes and other means. The content provider 104 may also provide graphics, content description, and other metadata 208 to the system.

The content provider 104 may be various types of content providers and provide various types of content. More than one content, the content provider 104 may provide various types of data including advertising information. Advertising providers may provide information on various products or various available or future content. It should be noted that the advertising provider and the content provider may be one in the same.

The content processing system 102 may include a content processing module 202 that receives the various content and converts the format, if necessary. Among other things, the content processing system 202 may encode and packetize the content. The encoded data is may be packetized into a stream of data packets that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The formatted and processed content may be stored in a content repository 204 for later delivery. The content repository 204 may provide content to a broadcast transport processing system 206 to communicate the content through one or both of the satellites 108A, 108B illustrated in FIG. 1. The content, as described above, may also be suitable for other types of wired or wireless delivery. The broadcast transport processing system 206 may provide the content therethrough.

The content processing system 202 may receive ads from an ad source 210A and 210B. Although two ad sources are illustrated, various numbers of ad sources may be provided including one ad source or more than two ad sources. The ad sources 210A, B may provide advertising content material. The advertising content material may be processed by the content processing system 202 and also stored within a content repository 204.

A content management system 220 generally controls the overall movement and distribution of contents through the content processing system 102. The content management 220 may also assign or manage (or both) material identifications to the various received content. The material identification may utilize the asset identifier (ID) in the metadata as well as the provider ID. Content, posters and other received information may be assigned related material identifications to make them easier to associate and retrieve. For example, different suffixes may be used to identify related content with the remainder of the material identification being the same. Titles, description, various categories and metadata may be managed by content management system 220 to use in other systems.

A traffic and scheduling system (DTSS) 228 is used to manage the broadcast schedule. For example, the broadcast schedule for both content and advertisements may use the requested channel, program associated data (PAD), channel information and program information packets (PIPs). The traffic and scheduling system 228 may schedule content processing for a plurality of received assets based on a schedule or desired program lineup. This may include on-demand programming, linear programming and advertisements. The linear programming provides live broadcasts through the satellite which may include tones for triggering the insertion of advertisements.

The traffic and scheduling system 228 may include a traffic and scheduling system database 230 for storing various scheduling data including identification and scheduling data therein. A traffic and scheduling system process manager 232 may also be included within the traffic and scheduling system 228. The process manager 232 manages the process including receiving a scheduling commitment request based on various scheduled events that are in the database 230.

A broadcast operation channel (BOC) management system (BMS) 236 may also be included within the system. The BMS 236 may provide scheduling for the broadcast channels. It should be noted that the broadcast channels may not correspond to network programming. Broadcast channels refer to the channels used by the satellite for broadcasting various content to users. The broadcast channels themselves are typically unknown to the end user. In some configurations, a broadcast channel may be used for a single network. During other conditions, broadcast channels may be changed, allocated and reallocated among various networks.

The BMS 236 may provide a list of ad insertion schedule channels to the system. The data may include a schedule channel number and a schedule time. A stream mode, compression format, video vertical resolution and video scan mode may also be included within the data.

The content processing system 102 may also include an ad extraction and reconciliation system (AER) 240. The AER 240 may perform various functions including automatically extracting ad insertion schedules, managing the ad insertion schedules in persistent storage, providing the ad insertion schedules to the traffic and scheduling system for downstream processing, processing the as-run log data from various automation systems, communicating as-run conciliation data to an ad source and managing the mapping between the traffic and scheduling system and the ad source 210A, B. However, it should be noted that some or all of the functions above may be provided in a particular system.

The AER 240 may include a core extraction/reconciliation controller module 250. The core extraction/reconciliation controller module 250 may be microprocessor-based and may act as a controller that controls the processing of the schedules, substitution of ads under various conditions, reconciliation and ad processing through the system.

The ad extraction and reconciliation (AER) module 240 may include an extraction manager module 252 and a reconciliation manager module 254. Likewise, a second extraction manager module 256 and a second reconciliation manager module 258 may also be provided. In this example, the first extraction manager module 252 and the reconciliation manager module 254 may be provided for systems that use the Society of Cable Telecommunications Engineers (SCTE) 130 standard.

The second extraction manager module 256 and the second reconciliation manager 258 may use the Society of Motion Picture and Television Engineers (SMPTE) 2021 standard which may be referred to as the Broadcast eXchange Format (BXF). Of course, either one of the standards may be used alone or in combination. As well, other types of standards may be used for communicating between the ad source 210 and the core extraction and reconciliation module 250. As illustrated, the ad source 210B may support both types of standards and thus communication between both the extraction manager module 252 and extraction manager 256 is illustrated.

The extraction manager module 252 may generate a placement request with one or both of the ad sources 210A, B. The placement request message signal may include a message identifier, a version, an identity, a system, an identifier for previously transmitted messages, a network, a zone, a placement opportunity, a string identifier, a start time window, and an end time window. For example, the number of days to retrieve may be configured for two days and the time to perform the daily retrieval is at a scheduled time such as 04:00 ET. The ad insertion schedules may be requested at a predetermined time at a predetermined period of time. The ad insertion schedules may be requested regularly such as daily. For example, every morning an extraction of the insertion schedules may be provided. Of course, irregular requesting of schedules may also be supported.

In response to the request, a placement response such as an advertisement schedule may be generated from the ad sources 210A, B. Some or all of the following data may be provided in the placement response message. A message identifier, a version, an identity, an originating system, a message reference, a class, a detail integer, a system content zone, an identifier, and a start time. It should be noted that the start time may be equal to or after the start window and before the window end in the request message. Otherwise, placements may not be scheduled. A window end time may also be provided. As well, a placement identifier, a position, and action may also be provided. A traffic identifier, a spot identifier, and a spot type identifier may also be provided.

The extraction manager 256 may receive a schedule from the ad source 210B and provide a schedule acknowledgement to the ad source 210B in response thereto.

The reconciliation manager 254 may generate a placement status notification signal and communicate the placement status notification signal to one or both of the ad sources 210A, 210B. The placement status notification signal may include a message identifier, a version, an identity, and a system. A network and zone identifier may also be identified. The actual event time and type of status may also be provided. A status code and an external status code may also be provided.

The ad sources 210A, 210B may also provide ad placement acknowledgements. The AER 240 may send an acceptance or rejection of the ad schedule update notification by returning the placement status acknowledge signal. Various types of data may be returned in the placement status acknowledgement data including a simple byte or word that acknowledges the receipt of the status notification.

Either or both of the reconciliation managers 250A may provide an as run reconciliation signal to the ad source 210 for the ad sources 210A, 210B. An as-run reconciliation acknowledge signal may be provided back from the ad source 210A to the reconciliation manager 258. The placement status notification described above may be equivalent to the as-run reconciliation signal.

The core extraction and reconciliation controller module 250 may generate a schedule channel request signal to the broadcast operation channel management system 236. The schedule channel request signal may include a request for a list of ad insertion schedule channels and a schedule channel configuration. A schedule channel number, schedule time, stream mode, compression format, video vertical resolution, and video scan mode may all be provided in a schedule channel data signal communicated from the BMS 236 to the core extraction and reconciliation module 250.

The core extraction and reconciliation controller module 250 may generate a content data request to the content management system 220. A content identifier, a provider name, a screen format such as HD or SD, a product type, a product sub-type, a material identifier, a description identifier, and a duration may all be provided in the content data return to the core extraction reconciliation module from the content management system (CMS) 220.

The ad extraction and reconciliation module 240 may include a schedule service module 259. The schedule service module receives a schedule query request to determine whether a given spot content is scheduled from a specific time or date into the future. A schedule query response from the schedule service 259 may be provided to the CMS 220 for providing an indication of whether a given spot content is scheduled from a specific time/date in the future.

The schedule service module 259 may also receive a material replacement notification and a material completion notification from the content management system 220. The content management system (CMS) 220 may request a replacement of a particular material identifier for a given spot from a specific time and date. The CMS 220 may also provide a notification that an advertisement spot is processed and is available for broadcast.

The AER 240 may also include a traffic and scheduling system adapter 260 that is in communication with the traffic and scheduling system database 230. Ad schedule events may be communicated from the DTSS adapter 260 which receives the schedule events from the core extraction and reconciliation module 250. The DTSS adapter 260 may delete older schedule events and save the new schedule of events from the DTSS adapter 260.

The DTSS adapter 260 may also be in communication with the DTSS process manager 232. The DTSS process manager 232 may receive a schedule commitment request signal from the DTSS adapter. The schedule commit request signal may notify the process manager 232 that a new ad schedule events has been extracted into the AER 240 and the DTSS database 230.

The core extraction and reconciliation module 250 may be in communication with an ad extraction and reconciliation database (AER DB) 262. The AER DB 262 may store schedule events and provide ad channel data to the core extraction and reconciliation module. The AER DB 262 may also provide placements and as-run data to the core extraction and reconciliation module 252.

An as-run ingestion manager module 264 may be in communication with the AER DB 262 and the core extraction and reconciliation module 250. The as-run ingestion manager 264 may provide as-run data to the database 262 and provide an as-run notification to the core extraction and reconciliation module 250.

A first as-run log processor module 266A and a second as-run log processor module 266B may be in communication with the as-run ingestion manager 264. The first as-run log processor 266A may be in communication with a first automation system 268A. The second as-run log processor module 266B may be in communication with a second automation system 268B. The first automation system 268A may generate an as-run log file and communicate the as-run log file to the first as-run log processor 266A. As-run log data may be provided to the as-run ingestion manager 264 and a file system 270. The as-run log includes data illustrating that the advertisement was run. The as-run log may include a date, time, advertisement identifier, and channel identifier. Other data may also be included.

The second automation system 268B may provide an as-run log message to the second as-run log processor. The second as-run log processor may generate a retrieval request to the second automation system 268B. In response to the retrieval, the as-run retrieval response may communicate the as-run log to the second as-run log processor 266B. The second as-run log data may be communicated to the as-run ingestion manager 264B and the as-run log file may be provided to the file system 270.

An ad extraction and reconciliation user interface 280 may also be provided within the system. A system operator may monitor the operation and control the operation of the ad extraction and reconciliation system through the user interface 280. Also, manual control of some functions may also be provided to the system. These may be provided in response to an AER system malfunction or may be provided depending upon the broadcast type. Some broadcast signals may require manual insertion for various advertisements in advertisement spots. Thus, ad channel data may be exchanged between the database 262 and the user interface 280.

The first automation system 268A and the second automation system 268B are systems that are used for automating the broadcast of content to various users. The first automation system 268A and the second automation system 268B may retrieve various content to be broadcasted to the user devices including advertisements and content signals according to the broadcast schedule from the DTSS 228 to form a broadcast signal that is communicated to the user devices. Tones, time code and other markers may be used to insert advertisements over other advertisements during ad spots/breaks. As will be described below, when a replacement advertisement is not available for a particular spot, the advertising content provided by the content provider may be broadcasted.

Figure 3:
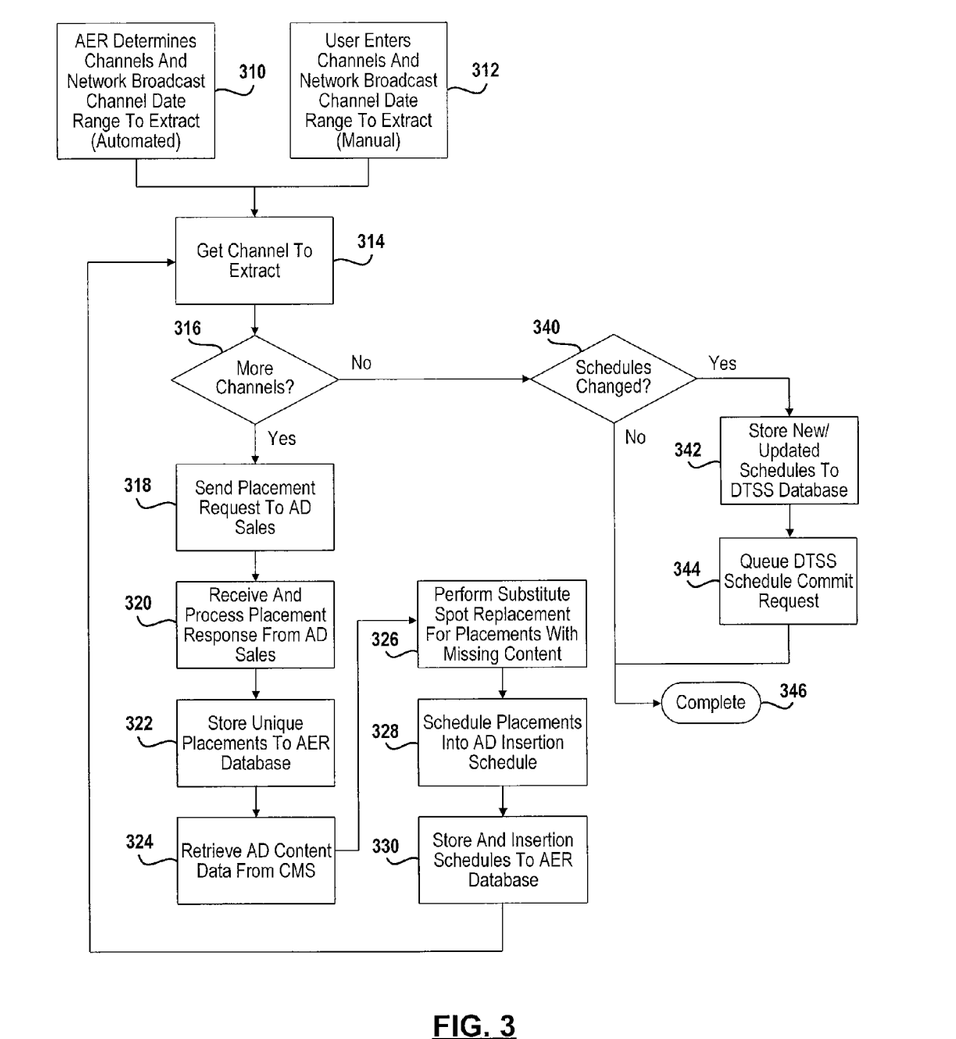
FIG. 3 is a flowchart of a method for generating a schedule according to the present disclosure.

Referring now to FIG. 3, a method for inserting ads into a broadcasted signal is set forth. The present disclosure automates the extraction of ad schedules from an ad sales module into a form that is used by the broadcast automation system. Upon airing of advertisement content, the invention reconciles the as-aired (as-run) information from the broadcast automation system into a form that the ad sales module uses for billing purposes.

In step 310, the ad extraction and reconciliation system determines the channels and the network broadcast channel date range to extract. As mentioned above, these are extracted from the broadcast monitoring system 236 as described above. An operator may also enter the channels and network broadcast date range to extract in step 312. This is a manual process that may be performed through the user interface 280 of FIG. 2.

In step 314, the channel to extract is obtained. After step 316, if more channel are to be extracted, step 318 is performed. In step 318, a placement request is communicated from the AER 240 to the ad source 210 illustrated above. The placement request is a query to receive an ad insertion schedule through electronic data transfer. In step 320, the placement response from the ad source 210 is provided to the AER system 240 of FIG. 2. The unique ad placements are stored within the AER database 262 in step 322.

In step 324, the ad content data is retrieved from the content management system. As described above, a content data request may be provided from the ad extraction reconciliation system and content data is provided in response to the content data request from the content management system 220 of FIG. 2. In step 326, substitute spot replacement may be provided for missing content when content has not been added to the system. This process will be further described below in FIG. 5.

In step 328, the advertisement content is placed into the ad insertion schedule. The ad insertion schedule may be stored within the ad extraction and reconciliation database 262 in FIG. 2.

After step 330, step 314 may be performed again which extracts another channel. In step 316, if no more channels are to be added, step 340 is performed. In step 340, it is determined whether the schedules have changed. If the schedules have changed, step 342 stores updated or new schedules to the traffic and scheduling system database as is illustrated by the scheduling events signal in FIG. 2. A schedule commit request is queued in step 344 and provided to the DTSS process manager 232 of FIG. 2. After this process, the providing of a schedule and committing content to the schedule is complete in step 346. The process is also complete in step 346 after the schedule is not changed in step 340.

Figure 4:
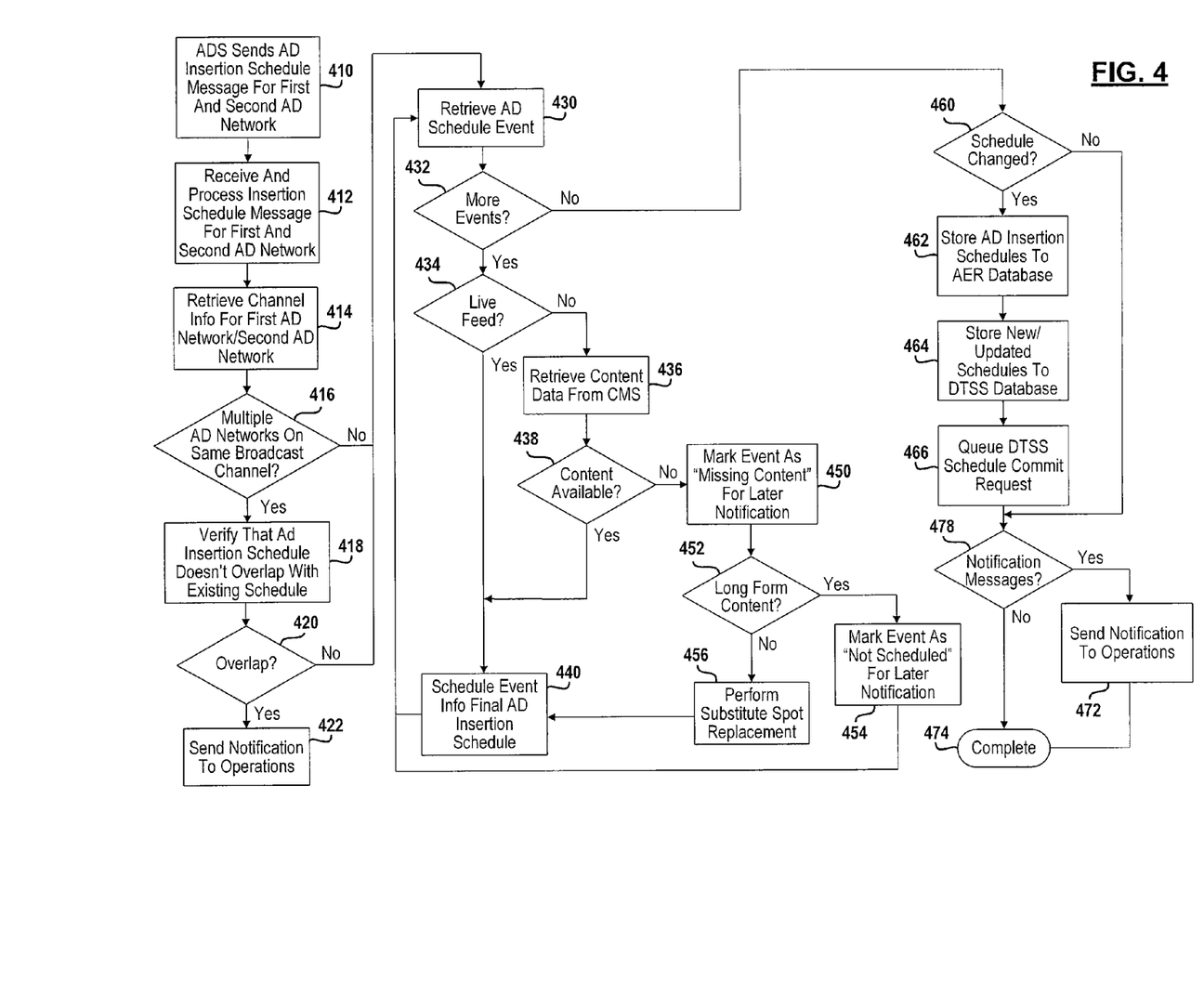
FIG. 4 is a flowchart of a method for generating schedules for ad insertion that includes multiple networks.

Referring now to FIG. 4, a method for performing replacements and broadcasting therewith as described in step 326 is provided in further detail.

In step 410, the ad source module 210 sends an ad insertion schedule message to the ad extraction reconciliation system for a first and second ad network. In step 412, the insertion schedule message is received and processed for the first and second ad network. In step 414, the channel information associated with the first ad network and the second ad network is retrieved. In step 416, if multiple ad networks are scheduled on the same broadcast channel, step 418 verifies that the ad schedule insertion does not overlap with an existing schedule. If an overlap does exist in step 420, step 422 sends a notification to the operation system that the ads have not been scheduled.

If multiple ads are not on the same broadcast channel in step 416 or no overlap exists in step 420, step 430 retrieves the ad schedule event. If there are more events in step 432, step 434 determines whether the feed is a live feed. If the feed is not a live feed, step 436 retrieves the content data from the content management system. If the content is available in step 438, step 440 schedules the event into a final ad insertion schedule. Step 440 is also performed if the feed is a live feed in step 444.

Referring back to step 438, when the content is not available, step 450 is performed. In step 450, the event may be marked as "missing content" for later notification in an as-run log. In step 452, if the content is long-form content meaning an infomercial or other long-running ad, step 454 marks the event as not scheduled for later notification. Thereafter, step 430 is again performed.

Referring back to step 452, if the content is not long-form content, step 456 performs substitute spot replacement as will be further described below.

After step 456, the schedule event is performed in step 440 as described above in which the schedule event is inserted into the final ad insertion schedule. After step 440 and step 454, step 430 is performed. After step 430, if no more events are available, step 460 is performed. In step 460, it is determined whether the schedule has changed. If the schedule has changed, step 462 stores an ad insertion schedule into the ad extraction and reconciliation database 262 of FIG. 2. After step 462, step 464 stores the new or updated schedules into the traffic and scheduling system database 230 of FIG. 2. Thereafter, step 466 queues the traffic and scheduling system commitment request and communicates the request to the process manager 232 illustrated in FIG. 2. After step 466, step 470 is performed. Step 470 is also performed when no schedule change is available. In step 470, it is determined whether any notification messages are available. If notification messages are available, step 472 communicates the operation to the AER system 240. If there are no notification messages available in step 470 or after step 242, step 474 completes the process.

Figure 5:
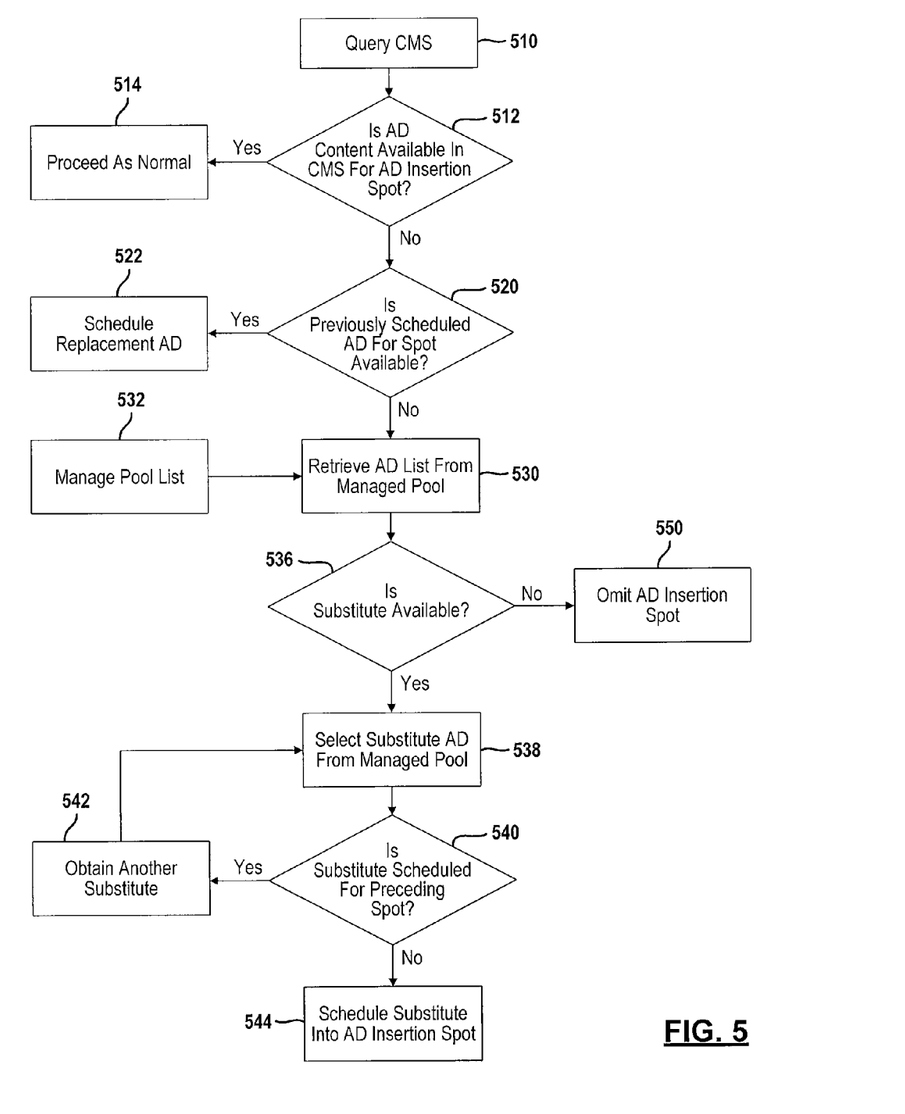
FIG. 5 is a method for substituting ad content when ad content is not available.

Referring now to FIG. 5, details of steps 326 and 456 are provided. In this process, a substitute spot replacement may be provided when content is not available for insertion. In step 510, a query of the CMS system is performed. In step 512, if ad content is available, the system proceeds as normal in step 514. That is, no substitute is performed.

In step 512, if the ad content is not available for insertion into the spot, step 520 determines whether a previously scheduled ad is available for the spot. If there is a previously scheduled ad available for the spot, step 522 schedules a replacement ad. If there is no previously scheduled ad for the spot in step 520, step 530 is performed. In step 530, a list of ads having a proper criteria for substitution is determined. The list is referred to as a managed pool. The managed pool may be managed through various sources including the ad source modules 210 illustrated in FIG. 2. The managed pool may be advertisements suitable for every channel and age group. They may thus be referred to as "evergreen," although this is not a requirement. The ad source modules 210 may manage the pool in step 532. The pools may also be managed by the core AER controller 250. Substitute ads may be added to and subtracted from the broadcast schedule during the course of a broadcast day. After step 530, step 536 determines whether a substitute is available. If a substitute is available, step 538 selects a substitute from the managed pool. After step 538, it is determined whether the substitute has been scheduled for a preceding spot in step 540. If the ad from the managed pool has been already scheduled for a preceding spot, step 542 obtains another substitute from the managed pool by again performing step 538. In step 540, if the substitute chosen from the managed pool is not selected for a preceding spot, step 544 schedules the substitute into the ad insertion spot.

Referring back to step 536, if a substitute is not available, the ad insertion spot may be omitted in step 550. By omitting the ad insertion spot, the ad provided from the content source may be broadcasted rather than an ad from the ad extraction and reconciliation process.

Figure 6:
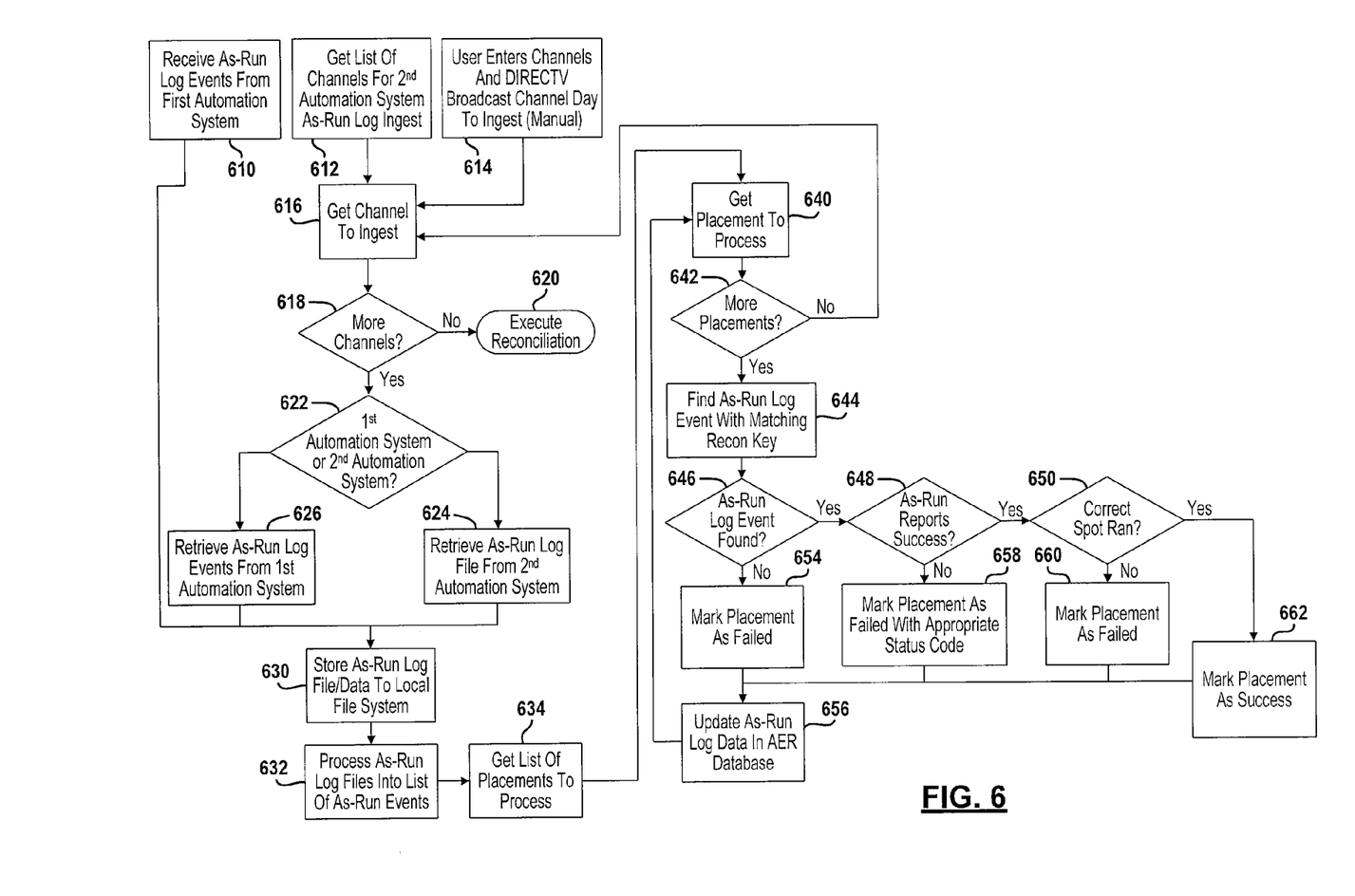
FIG. 6 is a flowchart of a method for ingesting an as-run log.

Referring now to FIG. 6, a method for ingesting and processing an as-run log is set forth. In step 610, an as-run log data and log file may be provided from one or all of the automation systems automatically. The as-run log may be provided for an ad channel or broadcast channel. In step 612, a list of channels for the second automation system as-run log may be provided. In step 614, the user or system operator for the AER system may enter the broadcast channel and day to ingest. This may be a manual process. After steps 612 and 614, step 616 obtains a channel to ingest. In step 618, if more channels are not available, reconciliation may be executed in step 620.

Referring back to step 616, if more channels are available to be ingested after step 618, step 622 determines whether a first automation or a second automation system is used. If a first automation system is used, the process suitable for retrieving an as-run log for the first automation system in step 624 may be performed. After step 622, if the second automation system is to have its as-run log retrieved, the process available for that automation system is performed in step 626.

After steps 610, 624 and 626, step 630 stores the as-run log to the local file system 270 illustrated in FIG. 2. After step 630, the run log may be processed into a list of run log events in step 632. After step 632, a list of ad placements to process may be generated in step 634. After step 634, step 640 may obtain the placements to be processed. If more placements are to be processed in step 642, step 644 finds an as-run log event with the matching reconciliation key. In step 646, if the as-run log event is found, step 648 determines if an as-run report is successful. If the as-run is successful, step 650 determines whether the correct spot ran. If the correct spot did run, step 652 marks the ad placement as successful.

Referring back to step 646, when the as-run log event is not found, the placement of the ad may be marked as failed in step 654. Thereafter, step 656 updates the as-run log in the ad extraction and reconciliation database 280 of FIG. 2. After step 646, step 640 may again be performed.

Referring back to step 648, if an as-run report is not successful, step 658 marks the placement as failed with an appropriate status code and step 656 is again performed.

Referring back to step 650, when the correct spot has not run, step 660 marks the placement as failed or provides an indicator of missing content. A specific code may be established for this purpose. After step 660, step 656 and steps 640 through 656 may be again performed.

When no more placements are available, step 616 is again performed which gets the channels to ingest.

Figure 7:
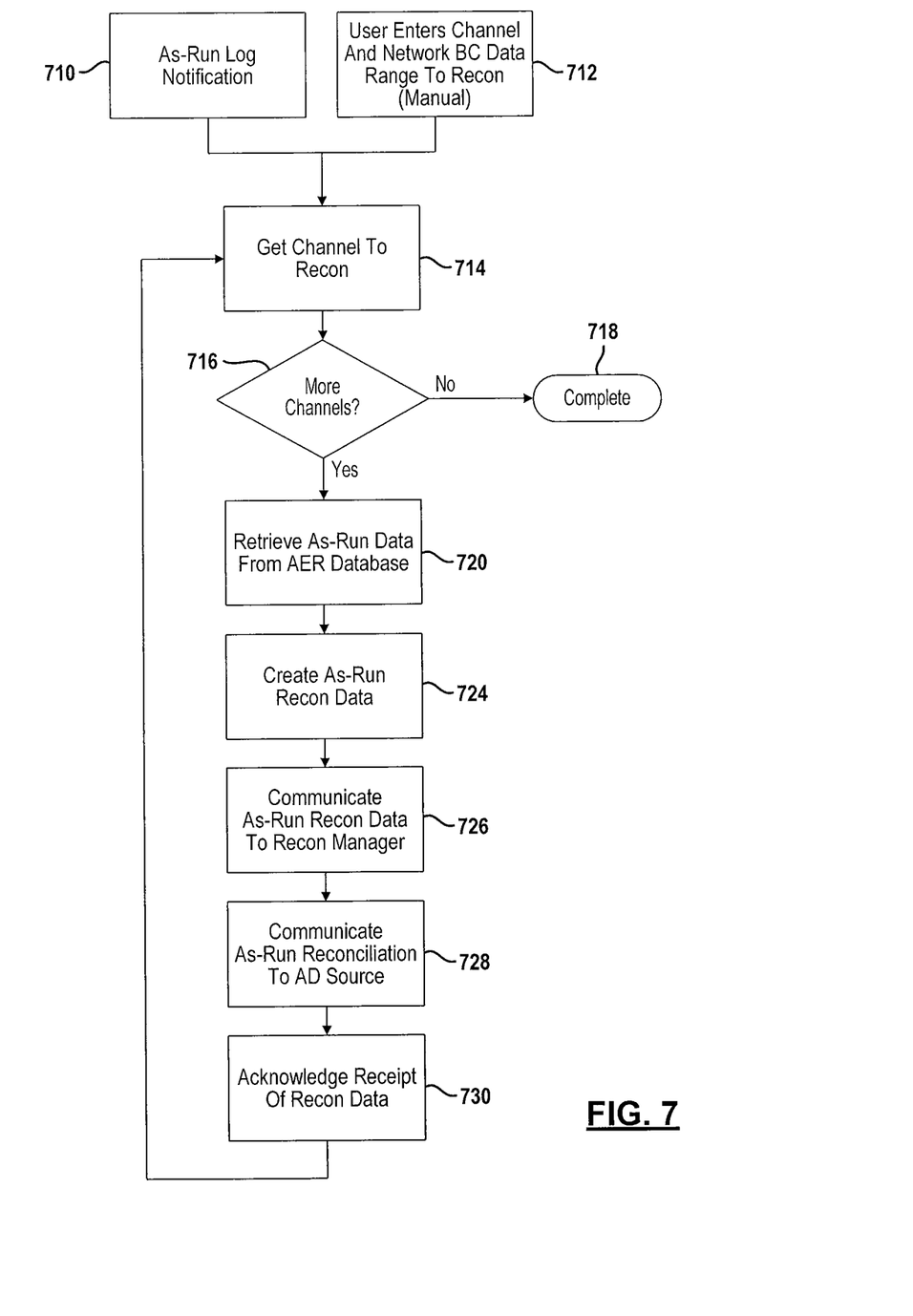
FIG. 7 is a flowchart of a method for performing reconciliation of the as-run log.

Referring now to FIG. 7, a method for reconciliation is provided. Reconciliation is the process of communicating the as-run ad data to the respective ad source. In step 710, an automatic as-run notification may be generated. In step 712, a manual process may be performed in which a system operator may enter the channel and network broadcast channel date range for reconciliation. In either case, after steps 710 and 712 the channel for reconciliation is obtained in step 714. After step 714, if more channels are not available for reconciliation in step 716, in step 718 the process is complete.

If more channels are available in step 716, as-run data is retrieved from the ad extraction reconciliation database 262 in FIG. 2. After step 720, step 724 creates as-run reconciliation data. Thereafter, step 726 communicates the as-run reconciliation data to one of the reconciliation managers associated with the desired ad source. Thereafter, step 728 communicates the as-run reconciliation data to the desired ad source.

As described above, an acknowledge signal may be used to acknowledge that the ad source successfully received the reconciliation data in step 730. After step 730, step 714 may be again performed for other channels for reconciliation.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
   receiving an advertisement schedule for an advertisement from an ad source module at an ad extraction and reconciliation module;
   receiving broadcast channel schedule data from a broadcast channel system at the ad extraction and reconciliation module;
   generating an advertising content data request signal for advertising content data including an advertisement content identifier for the advertisement;
   forming an advertisement insertion schedule having the advertisement content identifier and an advertising insertion spot associated with the advertisement content identifier from the broadcast channel schedule data and the advertisement schedule;
   when the advertisement is not available:
      retrieving a list of substitute advertisements suitable for use on every channel and for every age group;
      selecting one of the substitute advertisements from the list; and
      substituting the selected one of the substitute advertisements into the advertisement insertion schedule;
   communicating the advertisement insertion schedule to a broadcast scheduling system;
   inserting the advertisement corresponding to the advertisement content identifier into a broadcast signal according to the advertisement insertion schedule at an automation system;

in response to inserting, generating as-run data including the advertisement content identifier and a run time of the advertisement;

forming reconciliation data using the as-run data; and communicating the reconciliation data to the ad source module from the extraction and reconciliation module.

2. A method as recited in claim 1 further comprising storing the as-run data in a file system of the ad extraction and reconciliation module.

3. A method as recited in claim 1 wherein receiving an advertisement schedule comprises communicating a placement request signal to the ad source module and generating a placement response signal from the ad sales module.

4. A method as recited in claim 3 wherein communicating a placement request signal comprises communicating the placement request signal regularly.

5. A method as recited in claim 3 wherein communicating a placement request signal comprises communicating the placement request signal daily.

6. A method as recited in claim 1 wherein communicating the reconciliation data to the ad source module from the extraction and reconciliation module comprises communicating the reconciliation data to the ad source module through a reconciliation manager of the extraction and reconciliation module.

7. A method as recited in claim 1 wherein communicating the reconciliation data to the ad source module from the extraction and reconciliation module comprises communicating the reconciliation data to the ad source module automatically in response to receiving the reconciliation data at the extraction and reconciliation module.

8. A method as recited in claim 1 further comprising storing as-run data in a database within the ad extraction and reconciliation system.

9. A method as recited in claim 1 further comprising receiving an advertisement replacement signal from a content management system, and replacing the advertisement with a substitute advertisement.

10. A method as recited in claim 1 wherein when the list of substitute advertisements is exhausted, omitting the advertising insertion spot.

11. A method as recited in claim 1 wherein receiving an advertisement schedule comprises receiving a first ad insertion schedule for a first content and a second ad insertion schedule for a second ad content.

12. A method as recited in claim 11 further comprising when the second ad insertion schedule and the first ad insertion schedule do not overlap, scheduling the broadcast channel using the first ad insertion schedule and the second ad insertion schedule.

13. A method as recited in claim 11 further comprising when the second ad insertion schedule and the first ad insertion schedule overlap, generating a notification signal at a user interface of the ad extraction and reconciliation module.

14. An ad extraction and reconciliation system comprising:

an ad extraction manager module receiving an advertisement schedule for an advertisement from an ad source module;

a controller module receiving broadcast channel schedule data for a broadcast channel from a broadcast channel system and generating an advertising content data request signal for advertising content data including an advertisement content identifier for the advertisement;

said ad extraction manager module forming an advertisement insertion schedule having the advertisement content identifier and an advertising insertion spot associated with the advertisement content identifier from the broadcast channel schedule data and, when the advertisement is not available:

retrieving a list of substitute advertisements suitable for use on every channel and for every age group;

selecting one of the substitute advertisements from the list; and substituting the selected one of the substitute advertisements into the advertisement insertion schedule;

said controller module communicating the advertisement insertion schedule to a broadcast scheduling system; and an as-run manager module receiving as-run data including the advertisement content identifier and a run time of the advertisement after the advertisement was inserted into a broadcast signal according to the broadcast scheduling system at an automation system, said as-run manager module forming reconciliation data using the as-run data and the advertisement schedule and communicating the reconciliation data to the ad source module.

15. A system as recited in claim 14 wherein the ad extraction module communicates a placement request signal to the ad source module and receives the advertising schedule in response to the placement request signal.

16. A system as recited in claim 15 wherein the ad extraction module communicates the placement request signal regularly.

17. A system as recited in claim 15 wherein the ad extraction module communicates the placement request signal daily.

18. A system as recited in claim 14 wherein the as-run manager module communicates an as-run data notification signal to the controller, said controller automatically communicating the reconciliation data to a reconciliation manager.

19. A system as recited in claim 18 further comprising a database storing as-run data therein, said controller communicating the reconciliation data from the database to the reconciliation manager, said reconciliation manager communicating the reconciliation data to the ad source module.

20. A system as recited in claim 14 further comprising schedule service module receiving an advertisement replacement signal from a content management system, said controller replacing the advertisement with a substitute advertisement.

21. A system as recited in claim 14 wherein the controller module omits the advertising insertion spot when the list substitute advertisements is exhausted.

22. A system as recited in claim 14 wherein the extraction manager module receives a first ad insertion schedule for a first content and a second ad insertion schedule for a second ad content.

23. A system as recited in claim 22 wherein the controller module schedules the broadcast channel using the first ad insertion schedule and the second ad insertion schedule when the second ad insertion schedule and the first ad insertion schedule do not overlap.

24. A system as recited in claim 22 wherein the controller module generates a notification signal when the second ad insertion schedule and the first ad insertion schedule overlap.

25. A system comprising:

an ad extraction and reconciliation system as recited in claim 14;

the broadcast channel system communicating the broadcast channel schedule to the ad extraction and reconciliation system; and a content management system communicating advertising content data to the ad extraction and reconciliation system.

26. A system as recited in claim 25 further comprising the ad source module communicating the advertisement schedule to the ad extraction module.

27. A system as recited in claim 25 further comprising an automation system communicating as-run data to the ad extraction and reconciliation system.

* * * * *